Patented Sept. 3, 1929.

1,726,905

UNITED STATES PATENT OFFICE.

FRANK T. LAHEY, OF AKRON, OHIO.

FIBROUS PRODUCT AND METHOD FOR MAKING THE SAME.

No Drawing.   Application filed October 28, 1926.   Serial No. 144,909.

This invention relates to a fibrous product and method for making the same.

The general purpose of the invention is to provide an improved method for impregnating vegetable or animal fibres with colloidal substances, such as liquid latex, and other natural or artificial colloidal solutions of rubber, and other gums, and also to provide an improved impregnated fibrous product resulting from the practice of said method. As to this subject matter, the instant case is a continuation in part of the copending application Serial No. 137,817, filed September 25, 1926, for compositions of rubber, etc.

Another purpose of the invention is to provide a composition of fibrous material and a rubber-like colloid in which the latter is so dispersed in the fibres, as an agglutinant, that the resultant material will be semi-porous or absorbent of water or other saturators whereby it may be molded or sheeted to provide various desired shapes and further treated to provide articles having any desired properties for use as artificial leathers, substitutes for vulcanized fibres, insulators, floor coverings, hangings, tire fabrics, etc., and also to provide methods for making such materials and such articles.

The foregoing and other purposes are attained by the practice of the method and the use of the materials as described herein, but it is to be understood that the invention is not limited to the specific forms thereof disclosed.

In practicing the method, the fibres, either combed or in the form of batting, yarn or cloth, are first cleaned to free them of dirt, resins and other extraneous matters, and are then subjected to a mordanting treatment. The mordanting treatment will vary with the class or nature of the fibres. Both animal and vegetable fibres may be treated and may be either long, short or mixed staple fibres. In treating cotton batting, ammonium sulphate, tannates, etc., have been found to be satisfactory mordants. The mordanting chemical is preferably applied as a solution in water.

After absorption of the mordanting solution, the fibres are partially dried, excess moisture being removed, and to this product is added, as by immersion, spraying or absorption, a liquid latex, preferably diluted with water and which may contain sulphur or other curing agents and other compounding ingredients in the form of gelatinous mixtures with such substances as gums, resins, starches, dextrose, sugars, etc. Latices of rubber or its allied gums may be employed as well as colloidal solutions of unvulcanized rubber, such as crude rubber dissolved in linseed oil.

Latices of the Hevea tree are alkaline and in order to keep them in the condition as described by the Brownian movement and to prevent coagulation during shipment, it has been the practice to add ammonia. A mordant such as ammonium sulphate dissolved in water is hydrolized or broken up, producing ammonia in the fibrous material which, in the case of cotton, is absorbed to the extent of one hundred times the volume of cotton, the fibre of the cotton swelling and absorbing the sulphate which will coagulate the latex within the fibres, thus acting as a mordant to fix the rubber colloid upon and within the fibrous material.

When the fibres have absorbed the above colloidal solutions to the desired degree, the product is treated with suitable coagulants, e. g. lactic acid, and pressed through rollers to sheet it or otherwise formed and it is then dried by any of the known methods for drying fibres. Instead of coagulating the rubber-like substances in the fibres, the product may be dried without the use of coagulants.

The product obtained by incomplete impregnation with latex may be formed, when in a damp or wet state, into articles of various shape, either by molding a mass thereof or by sheeting and building up articles from dampened laminations thereof and subjecting them to pressure in molds to produce the desired shapes, the product being semi-porous and capable of absorbing water or other liquids and, when dried, of retaining the shape in which it is molded.

The material may be further treated either in sheet or other forms with suitable coating or impregnating compositions for producing various articles. For example, the material may be again treated, either with or without further mordanting, with rubber or like substances in the form of liquid latices or solutions or crude rubber milled with compounding ingredients and calendered or spread thereon. Under such circumstances the compounding ingredients could be omitted from the first treatment of the fibres with rubber colloid and the rubber subsequently vulcanized by migration of sulphur and other ingredients from the milled stock. Such materials, as artificial leathers, tire fabrics, etc., could be made by this further treatment.

Instead of treatment with additional rubber, the product may be treated with the guttas, balatas, varnishes, artificial resins, such as phenolic condensation products, cellulose solutions, halowaxes, the various vulcanized fibre producing agents, drying oils and other coating or impregnating compositions, to provide a variety of products, each having properties suitable for a variety of uses. All of these materials may be heated or otherwise treated to vulcanize the rubber therein.

The material is used in its semi-porous form as an artificial leather or the like since it is very strong and flexible and is also adapted for further treatment by reason of its semi-porosity, the saturators employed being absorbed into the fibres and when vulcanized, indurated or otherwise treated, depending upon the saturator, will be so bonded to the fibres as to provide an integral material having the desired properties, the rubber serving as an agglutinant and imparting such strength to the fibres that they are in a condition suitable for such further treatment in coating or impregnating machines. Should a spongy product be desired, volatile ingredients may be incorporated in the colloidal solution.

The term "mordant" as used in this specification is intended to cover any of a large number of substances which are capable of being absorbed by the fibrous material such as cotton batting and also of coagulating or fixing the latex about and within the fibers when the treated fibers are subsequently rubberized.

Modifications of the invention may be resorted to without departing from the spirit thereof or the scope of the appended claims.

What is claimed is:

1. A fibrous product comprising a semi-porous composition of mordanted fibres and a rubber-like colloid, capable of absorption of water or other liquids and moldable when moist.

2. That process of making a fibrous product which comprises freeing the fibres from extraneous matters, mordanting the fibres with a water solution, partially drying the fibres, treating the fibres with a colloidal solution comprising a latex and a gelatinous mixture containing a curing agent and other compounding ingredients, forming the product into the desired shape while moist, further treating the product with an impregnator, and drying the product.

3. That process of making a fibrous product which comprises freeing the fibres from extraneous matters, mordanting the fibres, treating the fibres with a colloidal solution comprising a latex, forming the product into the desired shape while moist, further treating the product with an impregnator, and drying the product.

4. That process of making a fibrous product which comprises freeing the fibres from extraneous matters, mordanting the fibres, treating the fibres with a rubber colloidal solution, forming the product into the desired shape while moist, further treating the product with an impregnator, and drying the product.

5. That process of making a fibrous product which comprises freeing the fibres from extraneous matters, mordanting the fibres, treating the fibres with a rubber colloidal solution, forming the product into the desired shape, and further treating the product with an impregnator.

6. That process of making a fibrous product which comprises mordanting the fibres, treating the fibres with a rubber colloidal solution, forming the product into the desired shape, and further treating the product with an impregnator.

7. That process for making a fibrous product comprising treating the fibres with a mordant, impregnating the fibres with a rubber-like, colloidal solution, coagulating the colloid on the fibres, forming the product to the desired shape while moist, and further impregnating the fibres with a saturator.

8. That process for making a fibrous product comprising treating the fibres with a mordant, impregnating the fibres with a rubber-like, colloidal solution, coagulating the colloid on the fibres, forming the product to the desired shape, and further impregnating the fibres with a saturator.

9. That process for making a fibrous product comprising treating the fibres with a mordant, impregnating the fibres with a rubber-like, colloidal solution, coagulating the colloid on the fibres, and forming the product to the desired shape.

10. That process for making a fibrous product comprising treating the fibres with a mordant, impregnating the fibres with a rubber-like, colloidal solution, coagulating the colloid on the fibres, forming the product to the desired shape while moist, and drying the product.

11. That process for making a fibrous product comprising mordanting the fibres, treating the fibres with a rubber-like, colloidal solution containing a curing agent, coagulating the rubber-like colloid from the solution onto the fibres, and vulcanizing the product.

12. That process for making a fibrous product comprising mordanting the fibres, treating the fibres with a rubber-like, colloidal solution, coagulating the rubber-like colloid from the solution onto the fibres, and vulcanizing the product.

13. A fibrous product comprising mordanted fibres on which a rubber colloid has been coagulated from a colloidal solution containing a curing agent and vulcanized.

14. A fibrous product comprising mordanted fibres on which a rubber colloid has been coagulated from a colloidal solution and vulcanized.

15. A fibrous product comprising mordanted fibres on which a rubber colloid has been coagulated from a colloidal solution.

16. The process of preparing fibres which consists in freeing the fibres from extraneous substances, mordanting the freed fibres to render them susceptible of colloidal impregnations, and impregnating the fibres with a rubber-like colloidal solution.

17. The process of preparing fibres which consists in freeing the fibres from extraneous substances, mordanting the freed fibres to render them susceptible of colloidal impregnations, and impregnating the fibres with a rubber-like colloidal solution containing a vulcanizing agent and thereinafter vulcanizing the fibrous material.

FRANK T. LAHEY.